(12) United States Patent
Kakutani

(10) Patent No.: US 9,036,204 B2
(45) Date of Patent: May 19, 2015

(54) IMAGE PROCESSING DEVICE, DISPLAY DEVICE AND IMAGE PROCESSING METHOD

(71) Applicant: SEIKO EPSON CORPORATION, Tokyo (JP)

(72) Inventor: Toshiaki Kakutani, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 186 days.

(21) Appl. No.: 13/762,189

(22) Filed: Feb. 7, 2013

(65) Prior Publication Data

US 2013/0215159 A1     Aug. 22, 2013

(30) Foreign Application Priority Data

Feb. 16, 2012    (JP) ................. 2012-031741

(51) Int. Cl.
*G06F 15/00* (2006.01)
*G09G 3/20* (2006.01)
*G09G 3/34* (2006.01)

(52) U.S. Cl.
CPC .............. *G09G 3/2044* (2013.01); *G06F 15/00* (2013.01); *G09G 3/2051* (2013.01); *G09G 3/2059* (2013.01); *G09G 3/344* (2013.01); *G09G 2300/08* (2013.01)

(58) Field of Classification Search
CPC ........... H04N 1/40; H04N 1/405; G06F 15/00
USPC ................... 345/690; 358/1.9, 3.13, 455, 457
See application file for complete search history.

(56) References Cited

U.S. PATENT DOCUMENTS

| | | | |
|---|---|---|---|
| 5,438,431 A * | 8/1995 | Ostromoukhov | 358/3.18 |
| 2002/0071140 A1 * | 6/2002 | Suzuki et al. | 358/455 |
| 2008/0192298 A1 * | 8/2008 | Asai | 358/3.13 |
| 2008/0309953 A1 | 12/2008 | Feng | |

FOREIGN PATENT DOCUMENTS

JP    2010-515926 A    5/2010

* cited by examiner

*Primary Examiner* — Claire X Pappas
*Assistant Examiner* — Abdul-Samad A Adediran
(74) *Attorney, Agent, or Firm* — Maschoff Brennan (57) ABSTRACT

An image processing device includes a processing device that performs a color reduction processing of converting data of a-levels of gray indicative of an image to be displayed in a display area including a plurality of pixels arranged along a first direction and a second direction into data of b-levels of gray (b<a) and, upon receiving an input of data for reducing the number of pixels with a first gray level in the display area to 50%, generates a result in which the arrangement of the pixels with the first gray level has blue noise characteristics in the display area, and the maximum value of the rate of occurrence of specific patterns in the display area is less than 7.0%.

7 Claims, 7 Drawing Sheets

BEFORE REWRITING
(16 GRADATIONS)

| 0 | 0 | 0 | 0 |
|---|---|---|---|
| 0 | 0 | 0 | 0 |
| 0 | 0 | 0 | 0 |
| 0 | 0 | 0 | 0 |

FIG. 7A

AFTER REWRITING
(16 GRADATIONS)

| 8 | 8 | 8 | 8 |
|---|---|---|---|
| 8 | 8 | 8 | 8 |
| 8 | 8 | 8 | 8 |
| 8 | 8 | 8 | 8 |

FIG. 7B

AFTER REWRITING
(IDEAL)

FIG. 7C

AFTER REWRITING
(BLURRING OCCURRED)

IMAGE PROCESSING DEVICE, DISPLAY DEVICE AND IMAGE PROCESSING METHOD

BACKGROUND

1. Technical Field

The present invention relates to color reduction processing that converts data of a-levels of gray indicative of an image to data of b-levels of gray (b<a).

2. Related Art

As a technology for improving the image quality in display devices having memory property, a technology that uses half-tone processing is known. For example, Japanese Laid-open Patent Application 2010-515926 describes a technology for displaying an image that has undergone half-tone processing in an electrophoretic display (EPD), which is one type of display devices having memory property.

When a certain specific pattern is displayed on a display device with memory property, there is a problem in that the gray level of the pattern as a whole would shift from an ideal state.

SUMMARY

In accordance with some aspects of the invention, a technology for suppressing generation of specific patterns is provided.

In accordance with an embodiment of the invention, an image processing device includes a processing device that performs a color reduction processing of converting data of a-levels of gray indicative of an image to be displayed in a display area including a plurality of pixels arranged along a first direction and a second direction into data of b-levels of gray (b<a), and, upon receiving an input of data for reducing the number of pixels with a first gray level in the display area to 50%, generates a result in which the arrangement of the pixels with the first gray level has blue noise characteristics in the display area, and the maximum value of the rate of occurrence of specific patterns in the display area is less than 7.0%, wherein the specific pattern is a pixel pattern formed by a first pixel having a gray level value of the first gray level and four pixels adjacent to the first pixel in the first direction and the second direction having gray level values other than the first gray level, and differences between the gray level values of the four pixels and the first gray level have the same sign. According to the image processing device of the present embodiment, the occurrence of density irregularity (density deviation from the ideal state) can be better suppressed, compared to the case where the maximum value of the rate of occurrence of the specific pattern exceeds 7.0%.

In accordance with a preferred embodiment, the maximum value of the rate of occurrence of the specific pattern may be less than 5.0%. According to such an image processing device, the occurrence of density irregularity can be better suppressed, compared to the case where the maximum value of the rate of occurrence of the specific pattern exceeds 5.0%.

In accordance with another preferred embodiment, the maximum value of the rate of occurrence of the specific pattern may be less than 3.1%. According to such an image processing device, the occurrence of density irregularity can be better suppressed, compared to the case where the maximum value of the rate of occurrence of the specific pattern exceeds 3.1%.

In accordance with still another preferred embodiment, the color reduction processing performed by the processing device may include an error diffusion processing, and a conversion processing that decides a gray level value of a target pixel after the conversion processing, based on comparison between a threshold value and a correction value obtained based on a gray level value of the target pixel before the conversion processing and an error diffused from another pixel due to the error diffusion processing. In the conversion processing, if the gray level value of another pixel having a specified position relation with respect to the target pixel satisfies a condition corresponding to the specified pattern, the processing device may change the value of the threshold value used for deciding the gray level value of the target pixel after the conversion such that the probability in which the gray level value of the target pixel becomes to be the first gray level reduces. According to such an image processing device, the occurrence of density irregularity can be suppressed when the color reduction processing by the error diffusion method is executed.

In accordance with yet another preferred embodiment, the color reduction processing performed by the processing device may include a conversion processing that decides a gray level value of a target pixel after the conversion, based on comparison between a dither value included in a dither matrix and a gray level value of each of the pixels. The dither matrix may be generated by a processing that calculates a granularity rating value at each of positions whose dither values are undecided, when the position of the $t^{th}$ dither value is to be decided, while positions of dither values up to the $(t-1)^{th}$ dither value have already been decided, and sets the $t^{th}$ dither value at a position with the best rating value calculated. When calculating the granularity rating value, if a position having a predetermined position relation with a target position, at which a dither value has already been set, satisfies a condition corresponding to the specific pattern, the processing device may change the rating value, such that the probability of setting a dither value at the target position is reduced. According to such an image processing device, the occurrence of density irregularity can be suppressed when the color reduction processing by the dither method is executed.

Further, in accordance with another embodiment of the invention, there is provided a display device having any one of the image processing devices described above, and a display portion having the display area described above. According to the display device described above, the occurrence of density irregularity can be better suppressed, compared to the case where the maximum value of the rate of occurrence of the specific pattern exceeds 7.0%.

In accordance with another embodiment of the invention, there is provided an image processing method of converting data of a-levels of gray indicative of an image to be displayed in a display area that includes a plurality of pixels arranged along a first direction and a second direction into data of b-levels of gray (b<a). The image processing method includes, upon receiving an input of data for reducing the number of pixels with a first gray level in the display area to 50%, generating a result in which the arrangement of the pixels with the first gray level has blue noise characteristics in the display area, and the maximum value of the rate of occurrence of a specific pattern in the display area is less than 7.0%, wherein the specific pattern is a pixel pattern formed by a first pixel having a gray level value of the first gray level and four pixels adjacent to the first pixel in the first direction and the second direction having gray level values other than the first gray level, and differences between the gray level values of the four pixels and the first gray level have the same sign. According to the image processing device of the present embodiment, the occurrence of density irregularity (density deviation from the ideal state) can be better suppressed, compared to the case where the maximum value of the rate of occurrence of the specific pattern exceeds 7.0%.

According to the image processing method described above, the occurrence of density irregularity can be better suppressed compared to the case where the maximum value of the rate of occurrence of the specific pattern exceeds 7.0%.

PREFERRED EMBODIMENTS

1. Configuration

Figure 1:
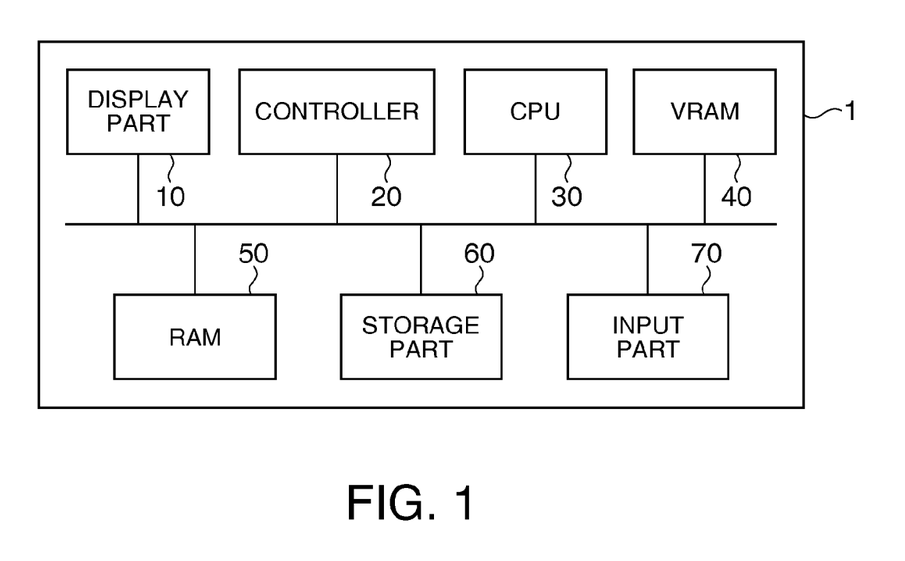
FIG. 1 is a block diagram of a hardware configuration of an electronic apparatus 1.

FIG. 1 is a block diagram of a hardware configuration of an electronic apparatus 1. The electronic apparatus 1 is a display device that displays images. In this example, the electronic apparatus 1 is a device for reading electronic books (an example of documents), in other words, an electronic book reader. The electronic apparatus 1 includes a display part 10, a controller 20, a CPU 30, a VRAM 40, a RAM 50, a storage part 60, and an input part 70. The display part 10 has a display panel including display elements for displaying an image. In this example, the display elements include display elements using electrophoretic particles, as display elements having the memory-property that retains a display state without supplying energy through voltage application or the like. The display part 10 displays an image in monochrome multiple levels of gray (in this example, two levels of gray of black and white) with the display elements. The controller 20 controls the display part 10. The CPU 30 is a device that controls each of the parts of the electronic apparatus 1. The CPU 30 uses the RAM 50 as a work area, and executes a program stored in a ROM (not shown) or the memory part 60. The VRAM 40 is a memory that stores image data indicative of an image to be displayed on the display part 10. The RAM 50 is a volatile memory that stores data. The storage part 60 is a storage device that stores various data and application programs, in addition to data of electronic books (book data), and includes an HDD or a nonvolatile memory such as a flash memory. The storage part 60 is capable of storing data of a plurality of electronic books. The input part 70 is an input device for inputting user's instructions, and includes, for example, a touch screen, key pads, buttons or the like. The components described above are interconnected through a bus.

Figure 2:
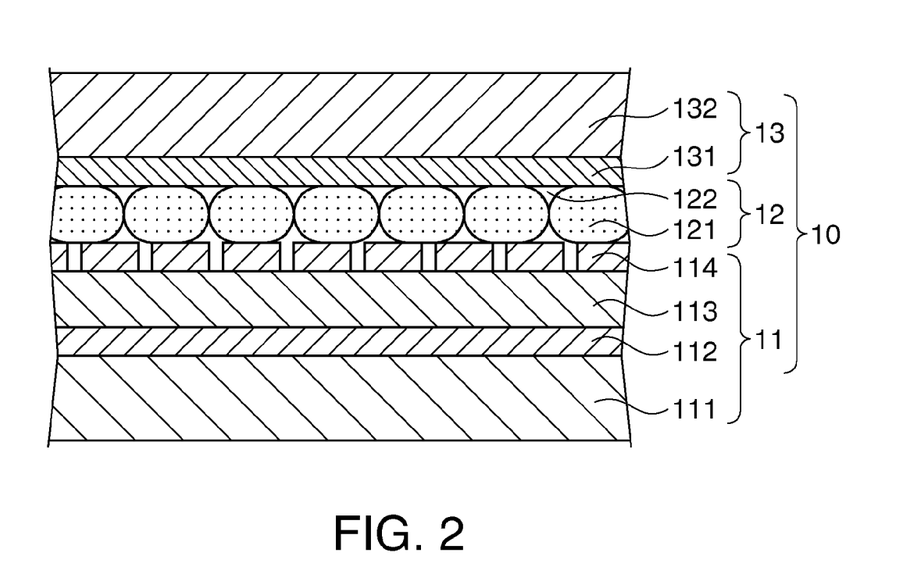
FIG. 2 is a schematic diagram of a cross-sectional structure of a display part 10.

FIG. 2 is a schematic view of the cross-sectional structure of the display part 10. The display part 10 includes a first substrate 11, an electrophoretic layer 12, and a second substrate 13. The first substrate 11 and the second substrate 13 are substrates for retaining the electrophoretic layer 12.

The first substrate 11 includes a substrate 111, a bonding layer 112 and a circuit layer 113. The substrate 111 is made of a material having dielectric property and flexibility, for example, a polycarbonate substrate. The substrate 111 may be made of any resin material that is light-weight, flexible, elastic and dielectric, without any particular limitation to polycarbonate. As another example, the substrate 111 may be formed from glass material without flexibility. The bonding layer 112 is a layer that bonds the substrate 111 and the circuit layer 113 together. The circuit layer 113 is a layer having a circuit for driving the electrophoretic layer 12. The circuit layer 113 has pixel electrodes 114.

The electrophoretic layer 12 includes microcapsules 121 and a binder 122. The microcapsules 121 are fixed by the binder 122. The binder 122 may be made of any material that has good affinity with the microcapsules 121, excellent adhesion to the electrodes, and dielectric property. Each of the microcapsules 121 is a capsule containing a dispersion medium and electrophoretic particles. The microcapsules 121 may preferably be made of a material having flexibility, such as, composites of gum arabic and gelatin, urethane compounds, and the like. It is noted that an adhesive layer made of adhesive may be provided between the microcapsules 121 and the pixel electrodes 114.

As the dispersion medium, it is possible to use any one of materials including water; alcohol solvents (such as, methanol, ethanol, isopropanol, butanol, octanol, and methyl cellosolve); esters (such as, ethyl acetate and butyl acetate); ketones (such as, acetone, methyl ethyl ketone, and methyl isobutyl ketone); aliphatic hydrocarbons (such as, pentane, hexane, and octane); alicyclic hydrocarbons (such as, cyclohexane and methylcyclohexane); aromatic hydrocarbons (such as, benzene, toluene, long-chain alkyl group-containing benzenes (such as, xylenes, hexylbenzene, heptylbenzene, octylbenzene, nonylbenzene, decylbenzene, undecylbenzene, dodecylbenzene, tridecylbenzene, and tetradecylbenzene)); halogenated hydrocarbons (such as, methylene chloride, chloroform, carbon tetrachloride, and 1,2-dichloroethane); and carboxylates. Also, the dispersion medium may be made of any one of other various oils. The dispersion medium may use any of the materials described above in combination. Further in another example, the dispersion medium may be further mixed with a surfactant.

The electrophoretic particles are particles (polymer or colloid) having a property in which the particles move in the dispersion medium by electric fields. In the present embodiment, white electrophoretic particles and black electrophoretic particles are contained in each of the microcapsules 121. The black electrophoretic particles are particles including black pigments, such as, for example, aniline black, carbon black and the like, and are positively charged in the present embodiment. The white electrophoretic particles are particles including white pigment, such as, for example, titanium dioxide, aluminum oxide and the like, and are negatively charged in the present embodiment.

The second substrate 13 includes a common electrode 131 and a film 132. The film 132 seals and protects the electrophoretic layer 12. The film 132 may be formed from a material that is transparent and has a dielectric property, such as, for example, polyethylene terephthalate. The common electrode 131 is made of a transparent conductive material, such as, for example, indium tin oxide (ITO).

Figure 3:
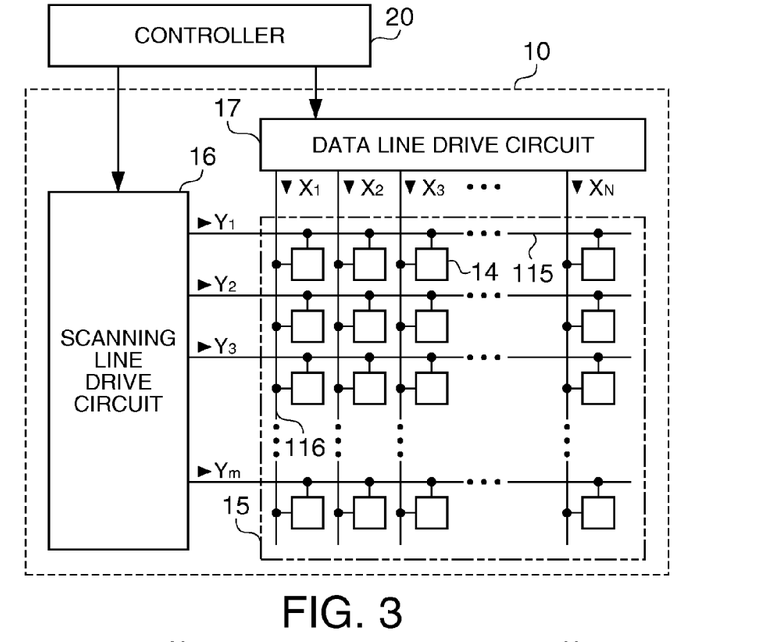
FIG. 3 is a diagram showing a circuit configuration of the display part 10.

FIG. 3 is a diagram showing a circuit configuration of the display part 10. The display part 10 includes m scanning lines 115, n data lines 116, m×n pixels 14, a scanning line drive circuit 16, and a data line drive circuit 17. The scanning line drive circuit 16 and the data line drive circuit 17 are controlled by the controller 20. The scanning lines 115 are arranged along a row direction (x direction), and transmit a scanning signal. The scanning signal is a signal that sequentially, exclusively selects one scanning line 115 from among the m scanning lines 115. The data lines 116 are arranged along a column direction (y direction), and transmit data signals. The data signals are signals indicative of levels of gray of each pixel. The scanning lines 115 are insulated from the data lines 116. The pixels 14 are provided at positions corresponding to intersections between the scanning lines 115 and the data lines 116, and exhibit gray levels according to the respective data signals. It is noted that, when one scanning line 115 among the plurality of scanning lines 115 needs to be distinguished from the others, it is called the scanning line 115 in the first row, the second row, . . . , or the $m^{-th}$ row. The data lines 116 may be similarly distinguished. The m×n pixels 14 form a display area 15. Among the display area 15, when a pixel 14 at the $i^{-th}$ row and the $j^{-th}$ column is to be distinguished from the others, it is referred to as a pixel (j, i). Parameters that have one-to-one correspondence with the pixels 14, such as, gray level values and the like are similarly expressed.

The scanning line drive circuit 16 outputs a scanning signal Y for sequentially, exclusively selecting one scanning line 115 from among the m scanning lines 115. The scanning signal Y is a signal that sequentially, exclusively becomes to be H (High) level. The data line drive circuit 17 outputs data signals X. The data signals X are signals indicative of data voltages corresponding to gray level values of pixels. The data line drive circuit 17 outputs data signals indicative of data voltages corresponding to pixels in a row selected by the scanning signal. The scanning line drive circuit 16 and the data line drive circuit 17 are controlled by the controller 20.

Figure 4:
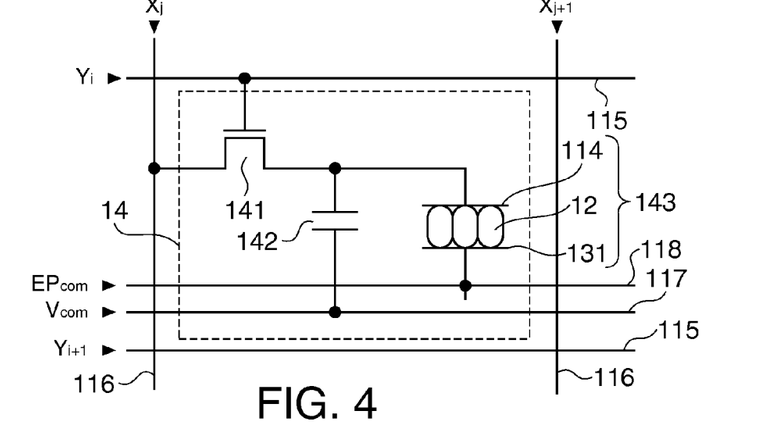
FIG. 4 is an equivalent circuit of a pixel 14.

FIG. 4 is a diagram showing an equivalent circuit of the pixel 14. The pixel 14 includes a transistor 141, a capacitance 142, a pixel electrode 114, an electrophoretic layer 12, and a common electrode 131. The transistor 141 is a switching element for controlling data writing to the pixel electrode 114, for example, an n-channel TFT (Thin Film Transistor). The transistor 141 includes a gate, a source and a drain, connected to the scanning line 115, the data line 116 and the pixel electrode 114, respectively. When a scanning signal at L (Low) level (non-selection signal) is inputted in the gate, the source and the drain of the transistor 141 become insulated from each other. When a scanning signal at H (High) level (selection signal) is inputted in the gate, the source and the drain of the transistor 141 become conductive to each other, and a data voltage is written to the pixel electrode 114. Also, the drain of the transistor 141 connects to the capacitance 142. The capacitance 142 retains a charge according to the data voltage. The pixel electrode 114 is provided at each of the pixels 14, and disposed opposite the common electrode 131. The common electrode 131 is commonly shared by the entire pixels 14, and is given a potential EPcom. The electrophoretic layer 12 is held between the pixel electrode 114 and the common electrode 131. The pixel electrode 114, the electrophoretic layer 12 and the common electrode 131 form an electrophoretic element 143. A voltage corresponding to a potential difference between the pixel electrode 114 and the common electrode 131 is applied to the electrophoretic layer 12. In the microcapsules 121, the electrophoretic particles move according to a voltage applied to the electrophoretic layer 12, thereby expressing a gray level. When the potential on the pixel electrodes 114 is positive (for example, +15V) with respect to the potential EPcom on the common electrode 131, the negatively charged white electrophoretic particles move toward the pixel electrode 114, and the positively charged black electrophoretic particles move toward the common electrode 131. As the display section 10 is viewed from the side of the second substrate 13, the pixels appear in black. When the potential on the pixel electrodes 114 is negative (for example, −15V) with respect to the potential EPcom on the common electrode 131, the positively charged black electrophoretic particles move toward the pixel electrodes 114, and the negatively charged white electrophoretic particles move toward the common electrode 131. In this instance, the pixels appear in white.

In the following description, a period starting from the selection of the scanning line in the $1^{st}$ row by the scanning line drive circuit 16 until the completion of the selection of the scanning line in the $m^{-th}$ row is referred to as a "frame period" or, simply a "frame." Each of the scanning lines 115 is selected once in each frame, and a data signal is supplied to each of the pixels 14 once in each frame.

Figure 5:
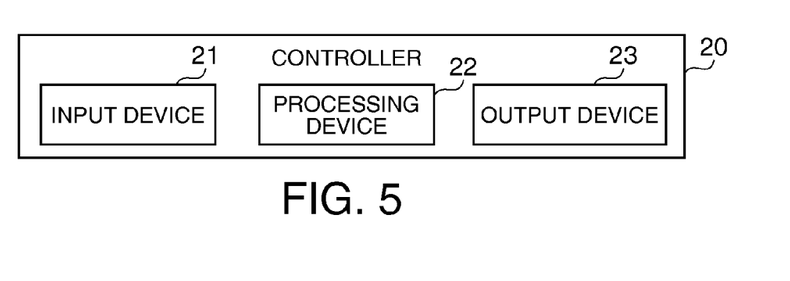
FIG. 5 is a diagram showing a functional configuration of a controller 20.

FIG. 5 is a diagram showing a functional configuration of the controller 20. The controller 20 includes an input device 21, a processing device 22, and an output device 23. The input device 21 inputs image data in the processing device. The image data is data of a-levels of gray indicative of an image to be displayed in the display area including the plurality of pixels arranged along a first direction and a second direction. The processing device 22 performs a color reduction processing that converts the input image data into data of b-levels of gray (b<a). Upon receiving an input of data for reducing the ratio of the number of pixels with a first gray level in the display area to 50%, the processing device 22 generates a result in which the arrangement of the pixels with the first gray level in the display area has blue noise characteristics, and the maximum value of the rate of occurrence of a specific pattern in the display area is less than 7.0%. Note that the blue noise characteristics are characteristics in which the peak (the maximum value) of the spectral intensity is in the high frequency side (for example, 1 cycle/mm and higher). The output device 23 outputs a control signal corresponding to the result of the color reduction processing to the scanning line drive circuit 16 and the data line drive circuit 17.

2. Operation 2-1. Outline of Operation

Figure 6:
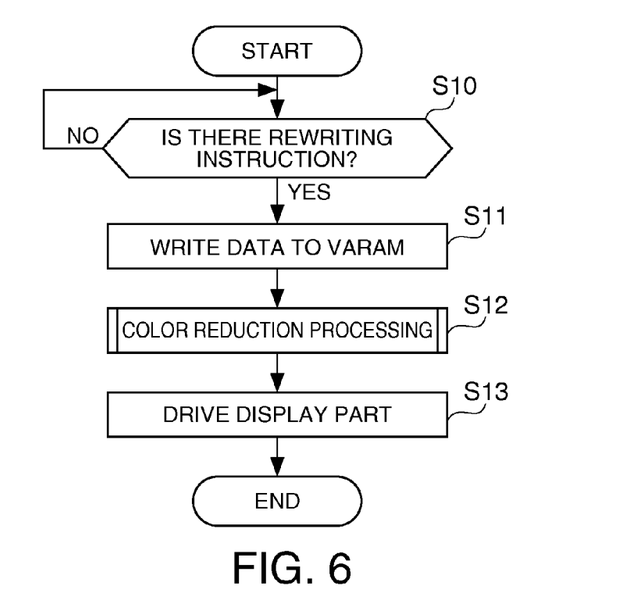
FIG. 6 is a flow chart showing the outline of operations of the electronic apparatus 1.

FIG. 6 is a flow chart showing the outline of operations of the electronic apparatus 1. In step S10, the CPU 30 judges as to whether there has been a rewriting instruction. The rewriting instruction is an instruction to rewrite an image displayed in the display part 10. For instance, the rewriting instruction is input by the user through the input part 70. When the CPU 30 judges that there was no rewriting instruction (S10: NO), the CPU30 stands by until a rewriting instruction is input. When it is judged that there was a rewriting instruction (S10: YES), the CPU30 shifts the processing to step S11.

In step S11, the CPU30 writes data indicative of an image after rewriting in the VRAM 40. The data written in the VRAM 40 here is data of a-levels of gray. In step S12, the controller 20 carries out a color reduction processing to the data indicative of the image after rewriting. The color reduction processing is a processing that converts the data of a-levels of gray into data of b-levels of gray (b<a). In step S13, the controller 20 drives the display part 10, using the data that has been color-reduction processed.

Figure 7A:
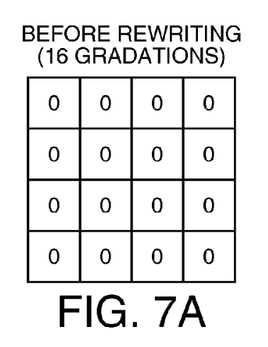
FIGS. 7A-7D are an illustration for describing a problem relating to the display of data that has undergone a color reduction processing.
Figure 7B:
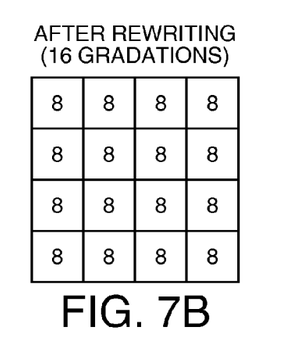
Figure 7C:
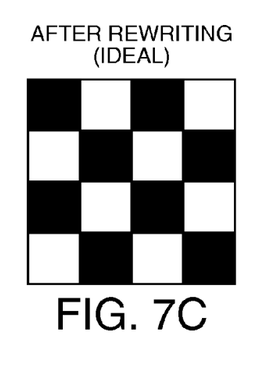
Figure 7D:
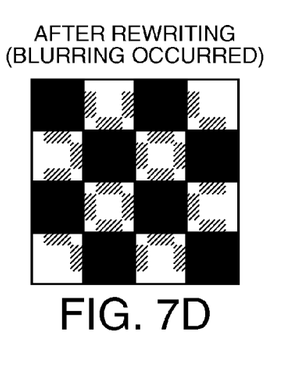

FIGS. 7A-7D are an illustration for describing problems concerning the display of data that has been color-reduction processed. Hereunder, an example in which a=16 and b=2, in other words, an example in which image data expressed in 16 levels of gray is converted to data in two levels of gray by the color reduction processing will be described. In this example, the gray level value 0 corresponds to white color, and the gray level value 15 corresponds to black color. FIGS. 7A and 7B illustrate image data (in other words, states before the color reduction processing), and FIGS. 7C and 7D illustrate display states (in other words, states after the color reduction processing) of the display part 10. FIG. 7A illustrates an example of image data before rewriting. In this example, the pixels in four rows by four columns are all in the gray level values 0 (in other words, white). FIG. 7B illustrates an example of image data after rewriting. In this example, the pixels in four rows by four columns are all in the gray level values 8 (in other words, gray). FIG. 7C shows an ideal display state based on the image data of FIG. 7B. The gray level value of the pixels in four rows by four columns is converted into either white or black by the color reduction processing. Though the gray level value of each pixel is either white or black, the group of pixels in four rows by four columns as a whole shows the gray level that corresponds to the image data of FIG. 7B.

The display state shown in FIG. 7C is ideal. However, in effect, so-called "blurring" (or gray level "blurring out" or "blurring in") may occur. "Blurring" refers to a phenomenon in which the gray level of a certain pixel is changed from its ideal state by the influence of the gray level of other adjacent pixels. In the example shown in FIG. 7, the entire pixels before rewriting are in a white state, and some of the pixels are rewritten from white to black. In this instance, because of the influence of the voltage applied to the pixels that are rewritten from white to black, electrophoretic particles near the borders of other pixels (whose gray level remains to be white) adjacent to the pixels rewritten would move, and their gray level of the other pixels would become blackish. This phenomenon typifies the "blurring."

FIG. 7D is a figure illustrating an example of the display state after rewriting. The figure schematically shows the state in which blurring appears in white pixels that adjoin the pixels rewritten from white to black. It is shown that, as compared to the ideal state shown in FIG. 7C, the gray level of the group of the pixels of four rows by four columns becomes more blackish as a whole due to the occurrence of the blurring. In other words, the gray level specified by the image data and the gray level actually displayed in the display part 10 are different from each other.

The magnitude of shift of the gray level value due to blurring depends on the arrangement pattern of white pixels and black pixels. For instance, when a black pixel adjoins a black pixel or a white pixel adjoins a white pixel, no blurring is generated. When white pixels and black pixels are alternately staggered, in other words, they are arranged in a checkered pattern, shift of the gray level due to blurring becomes most conspicuous.

Figure 8:
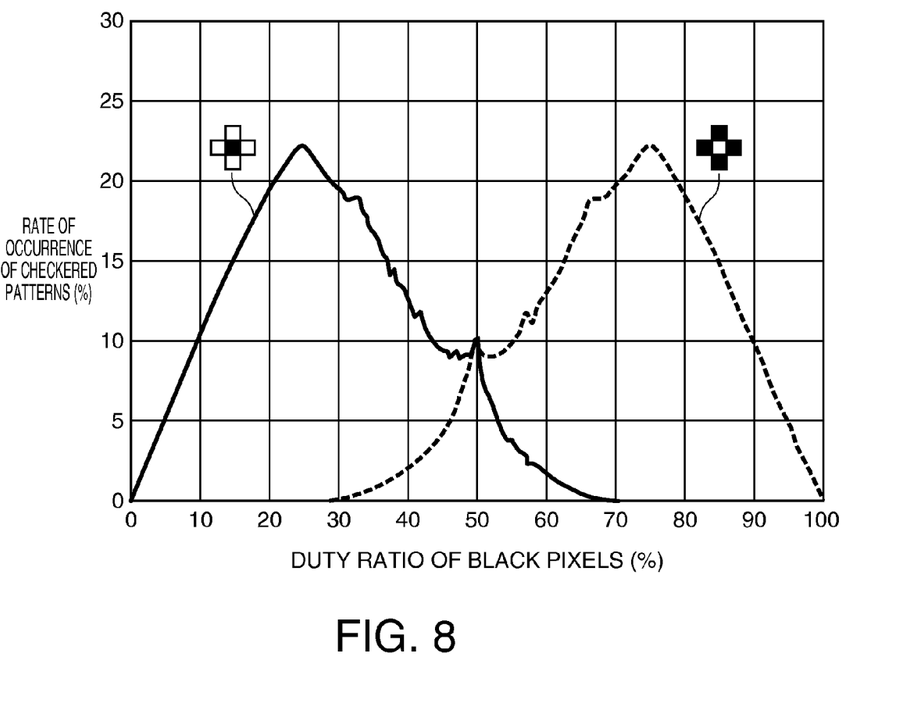
FIG. 8 is a graph showing an example of the rates of occurrence of checkered patterns.

FIG. 8 is a graph showing an example of the rate of occurrence of checkered patterns. In this example, a binarization processing using an error diffusion method is used as the color reduction processing. The horizontal axis shows the duty ratio of black pixels, and the vertical axis shows the rate of occurrence of checkered patterns. The duty ratio of black pixels refers to the ratio of the number of black pixels to the number of the entire pixels. In this example, the checkered pattern is defined as a pattern in which "the gray levels of pixels above, below, on the left and on the right of a target pixel are different from the gray level of the target pixel." For instance, when the target pixel is a black pixel, and all the pixels above, below, on the left and on the right of the target pixel are white pixels, the target pixel is judged to be in the checkered pattern. When the target pixel is a white pixel, and all the pixels above, below, on the left and on the right of the target pixel are black pixels, the target pixel is judged to be in the checkered pattern. The rate of occurrence of checkered patterns refers to the rate of the number of pixels that assume the checkered pattern to the number of the entire pixels. FIG. 8 shows a curve of the rate of occurrence when the target pixel is a black pixel (solid line), and a curve of the rate of occurrence when the target pixel is a white pixel (broken line).

In general, for expressing halftone by binary values of white and black, it is known that the use of dispersed-dot halftone having blue noise characteristics (for example, generated by a binarization processing using the error dispersion method or the blue noise mask method) would provide the highest image quality. However, the use of such binarization processing would more likely generate checkered patterns. This is because the checkered pattern is the best arrangement, from the viewpoint of granularity, when the duty ratio of black pixels is 50%. However, when a binarization processing in which the rate of occurrence of checkered patterns is 100% (the entire surface has uniform checkered patterns) when the duty ratio of black pixels is 50% is used, the smoothness of the output result to changes in the gray level would be lost. In other words, if the duty ratio of black pixels slightly shifts from 50% in this case, it becomes impossible to fill the entire surface with checkered patterns, resulting in portions where the checkered patterns collapse. Then, the granularity of the portion where the checkered patterns collapse would deteriorate rapidly, compared with the portion of uniform checkered patterns. The granularity after the binarization would rapidly deteriorate, even though the gray level value of the data before binarization has changed only slightly from the halftone gray level. In other words, if a binarization processing that exceptionally makes the granularity to be the best when the duty ratio of black pixels is 50% is used, the image quality may be felt rather deteriorated in cases other than the case where the duty ratio of black pixels is 50%. To avoid this, in the error diffusion method and the blue noise mask method, it is optimized such that the checkered patterns do not continuously extend to a wide range even when the duty ratio of black pixels is in the neighborhood of 50%. For this reason, the checkered pattern occurrence rate curves have the characteristics shown in FIG. 8.

Problems arise with the duty ratio of black pixels being in the neighborhood of 50%, specifically in the rate of occurrence of checkered patterns in which the target pixels are white pixels in the area where the duty ratio is below 50%, and the rate of occurrence of checkered patterns in which the target pixels are black pixels in the area where the duty ratio is above 50%. In the example of FIG. 8, the maximum value of the rate of occurrence in the curves (a broken line for the duty ratio below 50% and a solid line for the duty ratio above 50%) is about little less than 10%. Hereafter, the "maximum value of the rate of occurrence of checkered patterns" refers to the maximum value in the curve of the rate of occurrence of checkered patterns in which the target pixels are white pixels in the area where the duty ratio is below 50%, and the rate of occurrence of checkered patterns in which the target pixels are black pixels in the area where the duty ratio is above 50%. The checker patterns of such a rate of occurrence does not pose a problem in a display device that uses display elements other than electrophoretic elements and in an inkjet type image forming device.

However, in the display device that uses the electrophoretic elements, even if the halftone gray level in the entire surface being in solid color is displayed, portions where the checkered patterns occur might appear thicker than portions where the checkered patterns do not occur because of the blurring, which may be visually recognized as density irregularity. In the electronic apparatus 1, in consideration of the characteristics of the electrophoretic elements, there is provided a binarization processing in which the maximum value of the rate of occurrence of checkered patterns is lower than the example of FIG. 8.

Note that the phenomenon in which the area of white pixels becomes smaller by the erosion from adjoining black pixels may occur in an inkjet printer, other than the display device that uses the electrophoretic elements. However, this phenomenon in an inkjet printer does not pose a big problem, like in the display device that uses the electrophoretic elements. This is because "shifting in placement" of ink droplets always occurs to some degree in an inkjet printer. Therefore, the characteristics of the rate of occurrence of checkered patterns exemplified in FIG. 8 do not become a problem in an ink jet printer because of the following circumstances:

(1) the actual output does not provide regularly spread checkered patterns like the display device, and
(2) the shape of an ink droplet is not a rectangle but a circle, and to ease the generation of stripes that originate from the shift in droplet placement, the dot size is set larger than the pixel size. In other words, clear dots are hardly visually recognizable with the duty ratio being higher than 50%, providing an output result that is of density gradation in which the density increases in proportion to an increase in the duty ratio, rather than area gradation.

2-2. Processing Example 1 (Error Diffusion Methods)

Figure 9:
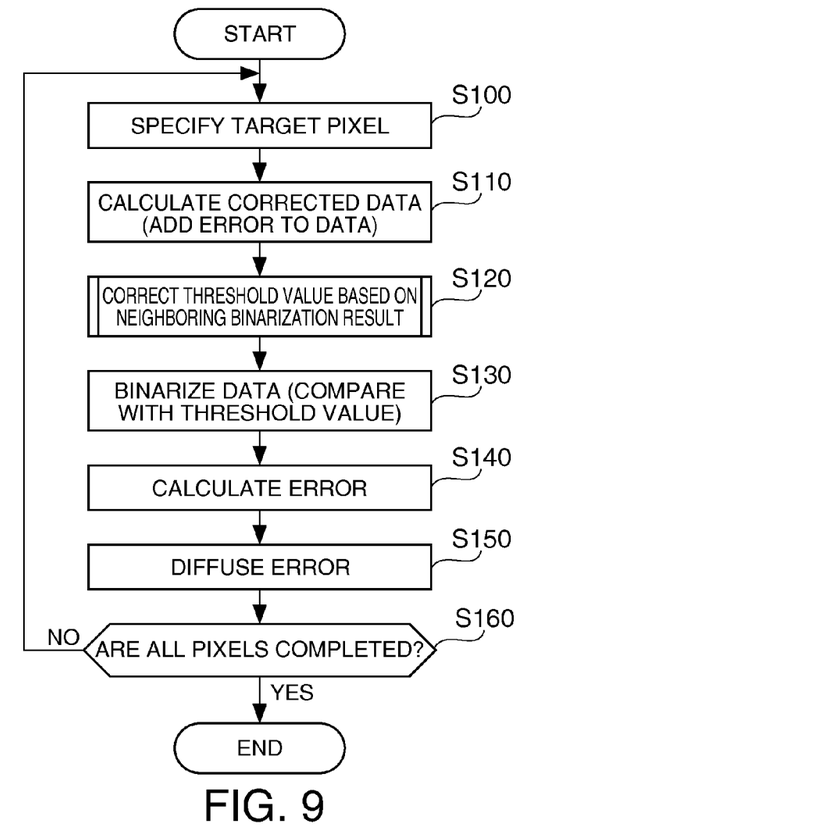
FIG. 9 is a flow chart showing an example of details of a color reduction processing in step S12.

FIG. 9 is a flow chart showing an example of details of the color reduction processing in step S12. In this example, a binarization processing by the error diffusion method is used as the color reduction processing.

The controller 20 specifies a target pixel in step S100. A pixel at the $i^{-th}$ row and the $j^{-th}$ column, among pixels of m rows by n columns, is specified as the target pixel. The initial condition is, for example, i=j=1.

In step S110, the controller 20 adds an error to data, and calculates corrected data. More specifically, the controller 20 calculates correction data at the $i^{-th}$ row and the $j^{-th}$ column, data_x[i][j] by the following expression (1).

$$data\_x[i][j]=data[i][j]+error\_buffer[i][j] \quad (1)$$

where data_x[i][j] is corrected data of a pixel at the $i^{-th}$ row and the $j^{-th}$ column, data[i][j] is data of the pixel at the $i^{-th}$ row and the $j^{-th}$ column, and error_buffer[i][j] is an error diffused from pixels that have been binarization-processed in the neighborhood of the pixel at the $i^{-th}$ row and the $j^{-th}$ column. Also, "=" is an operator that means substitution. data [i][j] is data that indicate gray level values (16 gray levels), where the minimum value 0 corresponds to white and the maximum value 15 corresponds to black. data_x[i][j], data[i][j], and error_buffer[i][j] are stored, for example, in the VRAM 40. In other words, the VRAM has memory areas that store data_x[i][j], data[i][j], and error_buffer[i][j]. The controller 20 reads out data data[i][j] and error error_buffer[i][j] from the VRAM 40, and writes the corrected data data_x[i][j] obtained by the expression (1) to the VRAM 40.

In step S120, the controller 20 corrects the threshold value threshold, referring to the binarization result of pixels in the neighborhood. More specifically, when the gray level value of other pixels that have a predetermined position relation with the target pixel satisfies a condition corresponding to a specific pattern, the controller 20 changes the threshold value used when deciding the gray level value of the target pixel after conversion so as to decrease the probability of the gray level value of the target pixel becoming a gray level that corresponds to the specific pattern.

Figure 10:
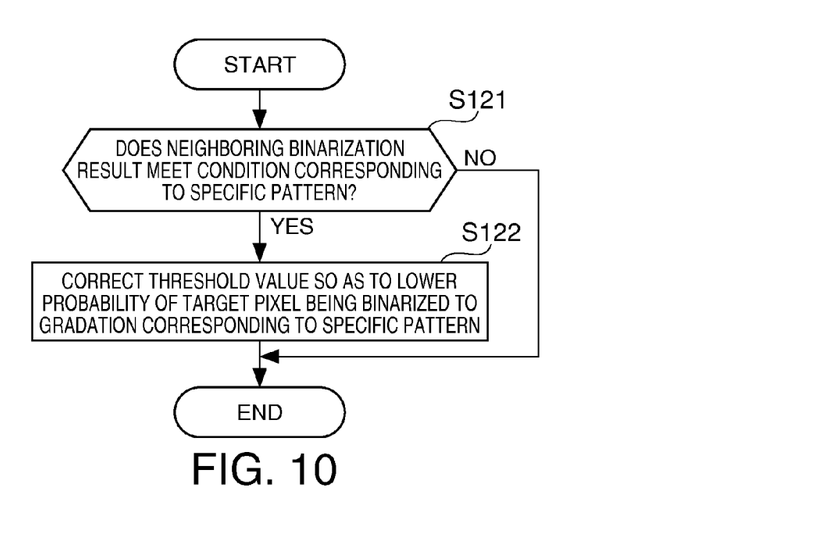
FIG. 10 is a flow chart showing details of a processing in step S120.

FIG. 10 is a flow chart showing details of the processing in step S120. In step S121, the controller 20 judges as to whether the binarization result of neighborhood pixels satisfies a condition corresponding to the specific pattern (checkered pattern). In this example, as the pixels in the neighborhood of the target pixel, five pixels whose binarization results have been confirmed at the time of processing the target pixel are used. When it is judged that the binarization result of a pixel in the neighborhood of the target pixel satisfies a condition corresponding to the specific pattern (S121: Yes), the controller 20 shifts the processing to step S122. When it is not judged that the binarization result of the pixel in the neighborhood of the target pixel satisfies a condition corresponding to the specific pattern (S121: No), the controller 20 shifts the processing to step S130 without correcting the threshold value.

In this example, in step S121, the controller 20 judges if the following expressions (2)-(6) are all satisfied.

$$result[i-1][j-1]==Black\_ON \quad (2)$$

$$result[i-1][j]==Black\_OFF \quad (3)$$

$$result[i-1][j+1]==Black\_ON \quad (4)$$

$$result[i][j-2]==Black\_ON \quad (5)$$

$$result[i][j-1]==Black\_OFF \quad (6)$$

where result[i][j] indicates a binarization result at the $i^{-th}$ row and the $j^{-th}$ column. Black_ON indicates that the binarization result is a black pixel, and Black_OFF indicates that the binarization result is a white pixel, respectively. Specifically, Black_ON indicates a gray level value (Black_ON=16 in case of 16 gray levels) that corresponds to a black pixel, and Black_OFF indicates a gray level value (Black_OFF=0) that corresponds to a white pixel, respectively. Moreover, "==" is an operator that means comparison whether the values of both sides are equal.

In step S122, the controller 20 makes a correction to increase the threshold value threshold by the following expression (7), such that the target pixel becomes more difficult to be binarized to a black pixel.

$$threshold\_X=threshold+thresh\_add \quad (7)$$

Here, threshold_X is the corrected threshold value. thresh_add is an addition value used for the correction, and is a constant that has a predetermined positive value.

Referring back to FIG. 9, in step S130, the controller 20 binarizes the corrected data of the target pixel. More specifically, the controller 20 compares the corrected data data_x with the threshold value threshold_X, and binarizes the corrected data to Black_ON (black pixel) or Black_OFF (white pixel).

$$\text{When data\_}x > \text{threshold\_}X, \text{result}[i][j] = \text{Black\_ON} \quad (8)$$

$$\text{When not data\_}x > \text{threshold\_}X, \text{result}[i][j] = \text{Black\_OFF} \quad (9)$$

In step S140, the controller 20 calculates an error based on the corrected data and the binarization result. More specifically, the controller 20 calculates an error "error[i][j]" by the following expression (10).

$$\text{error}[i][j] = \text{data\_}x[i][j] - \text{result}[i][j] \quad (10)$$

where error [i][j] indicates an error at the $i^{-th}$ row and the $j^{-th}$ column. The controller 20 stores the calculated error in the memory.

In step S150, the controller 20 disperses the error of the target pixel to the neighboring pixels. In this example, the controller 20 disperses the error with the same weight to four pixels on the right, below on the left, below, and below on the right by the following expressions (11)-(14).

$$\text{error\_buffer}[i][j+1] = \text{error\_buffer}[i][j+1] + \text{error}[i][j]/4 \quad (11)$$

$$\text{error\_buffer}[i+1][j-1] = \text{error\_buffer}[i+1][j-1] + \text{error}[i][j]/4 \quad (12)$$

$$\text{error\_buffer}[i+1][j] = \text{error\_buffer}[i+1][j] + \text{error}[i][j]/4 \quad (13)$$

$$\text{error\_buffer}[i+1][j+1] = \text{error\_buffer}[i+1][j+1] + \text{error}[i][j]/4 \quad (14)$$

In step S160, the controller 20 judges if the processing has completed for all of the pixels. If it is judged that there is still a pixel for which the processing has not been completed (S160: NO), the controller 20 shifts the processing to step S100. In step S100, the controller 20 updates the target pixel. More specifically, 1 is added to the parameter j that specifies the column. In case of j>n, the controller 20 adds 1 to the parameter i that specifies the row, while setting j=1. When it is judged that the processing is completed for the entire pixels (S160: YES), the controller 20 ends the processing in FIG. 9.

According to the processing described above, the greater the addition value thresh_add, the smaller the rate of occurrence of checkered patterns becomes. Therefore, by performing the processing described above while changing the addition value thresh_add beforehand by various values, the addition value thresh_add by which the rate of occurrence of checkered patterns becomes smaller than a predetermined value can be decided.

2-2-1. Modified Example 1 of Processing Example 1

The processing for correcting the threshold value in step S120 is not limited to the one described above. In place of the processing described above, for example, a processing that results in symmetry with the duty ratio of black pixels being about 50% may be performed. More specifically, the threshold value may be corrected in a manner that the probability of the target pixel being binarized to a black pixel is decreased when a checkered pattern whose target pixel is a black pixel would likely be formed, and that the probability of the target pixel being binarized to a white pixel is decreased when a checkered pattern whose target pixel is a white pixel would likely be formed. Specifically, when all of the following expressions (15)-(18) are satisfied, the controller 20 makes a correction to increase the threshold value "threshold" by the following expression (19), so that the target pixel would not readily be binarized to a black pixel.

$$\text{result}[i-1][j-1] == \text{Black\_ON} \quad (15)$$

$$\text{result}[i-1][j] == \text{Black\_OFF} \quad (16)$$

$$\text{result}[i-1][j+1] == \text{Black\_ON} \quad (17)$$

$$\text{result}[i][j-1] == \text{Black\_OFF} \quad (18)$$

$$\text{threshold\_}X = \text{threshold} + \text{thresh\_add} \quad (19)$$

Also, when all of the following expressions (20)-(23) are satisfied, the controller 20 makes a correction to decrease the threshold value "threshold" by the following expression (24), so that the target pixel would not readily be binarized to a white pixel.

$$\text{result}[i-1][j-1] == \text{Black\_OFF} \quad (20)$$

$$\text{result}[i-1][j] == \text{Black\_ON} \quad (21)$$

$$\text{result}[i-1][j+1] == \text{Black\_OFF} \quad (22)$$

$$\text{result}[i][j-1] == \text{Black\_ON} \quad (23)$$

$$\text{threshold\_}X = \text{threshold} - \text{thresh\_add} \quad (24)$$

2-2. Modified Example 2 of Processing Example 1

As the processing that corrects the threshold value in step S120, processings that increases and reduces the threshold value threshold may be switched about the duty ratio of black pixels being 50% as a boundary. More specifically, a processing that increases the threshold value threshold when the duty ratio is 50% or more and reduces the threshold value threshold when the duty ratio is less than 50% may be performed. Specifically, when all of the following expressions (25)-(29) are satisfied, the controller 20 makes a correction to increase the threshold value threshold by the following expression (30), so that the target pixel would not readily be binarized to a black pixel.

$$\text{data}[i][j] >= Cmax/2 \quad (25)$$

$$\text{result}[i-1][j-1] == \text{Black\_ON} \quad (26)$$

$$\text{result}[i-1][j] == \text{Black\_OFF} \quad (27)$$

$$\text{result}[i-1][j+1] == \text{Black\_ON} \quad (28)$$

$$\text{result}[i][j-1] == \text{Black\_OFF} \quad (29)$$

$$\text{threshold\_}X = \text{threshold} + \text{thresh\_add} \quad (30)$$

Note that Cmax indicates the maximum gray level value (Cmax=15 in case of 16 gray level values).

Also, when all of the following expressions (31)-(35) are satisfied, the controller 20 makes a correction to increase the threshold value threshold by the following expression (36), so that the target pixel would not readily be binarized to a black pixel.

$$\text{data}[i][j] < Cmax/2 \quad (31)$$

$$\text{result}[i-1][j-1] == \text{Black\_OFF} \quad (32)$$

$$\text{result}[i-1][j] == \text{Black\_ON} \quad (33)$$

result[$i-1$][$j+1$]==Black_OFF (34)

result[$i$][$j-1$]==Black_ON (35)

threshold_$X$=threshold−thresh_add (36)

2-2-3. Modified Example 3 of Processing Example 1

In the embodiments described above, the example in which the addition value thresh_add is a constant is described. However, thresh_add may be a function of data data[i][j]. The function thresh_add (data[i][j]) is a function that becomes larger when the duty ratio of black pixels is higher, and becomes smaller when the duty ratio of black pixels is lower.

2-2-4. Modified Example 4 of Processing Example 1

The cases where the threshold value correction processing in step S120 is performed may be restricted according to data. For example, the threshold value correction processing may be performed while restricting to a predetermined range, such as 6<data [i][j]<10 (in case of 16 levels of gray), with the duty ratio of black pixels being 50% as a reference.

2-2-5. Modified Example 5 of Processing Example 1

The condition to be used to judge whether neighboring pixels of a target pixel assume a checkered pattern may not be limited to the one described above. In the examples described above, the threshold value for binarization of a target pixel is corrected, referring to five pixels or four pixels among neighboring pixels of the target pixel. However, the threshold for binarization of a target pixel may be corrected, referring to fewer pixels, for example, binarization results of two neighboring pixels of the target pixel. Here, an example in which the threshold value is corrected referring to binarization results of pixels on the upper left and upper right of the target pixel will be described. Concretely, when all of the following expressions (37)-(39) are satisfied, the controller 20 makes a correction to increase the threshold value threshold by the following expression (40), so that the target pixel would not readily be binarized into a black pixel.

data[$i$][$j$]<$C$max/2 (37)

result[$i-1$][$j-1$]==Black_ON (38)

result[$i-1$][$j+1$]==Black_ON (39)

threshold_$X$=threshold+thresh_add (40)

Also, when all of the following expressions (41)-(43) are satisfied, the controller 20 makes a correction to increase the threshold value threshold by the following expression (44), so that the target pixel would not readily be binarized into a black pixel.

data[$i$][$j$]>=$C$max/2 (41)

result[$i-1$][$j-1$]==Black_OFF (42)

result[$i-1$][$j+1$]==Black_OFF (43)

threshold_$X$=threshold−thresh_add (44)

2-3. Processing Example 2 (Blue Noise Mask Method)

In this example, a binarization processing with a blue noise mask method is used as the color reduction processing. The Blue noise mask method is a type of the dither method. The dither method uses dither matrixes (dither masks). The dither matrix has a plurality of two-dimensionally arranged cells. A dither value is set to each of the cells. In a group of pixels having the same size as a dither matrix, the cells correspond one-to-one with the pixels. Data of a pixel is binarized according to a result of comparison between the dither value of a cell and the data of a pixel.

Figure 11:
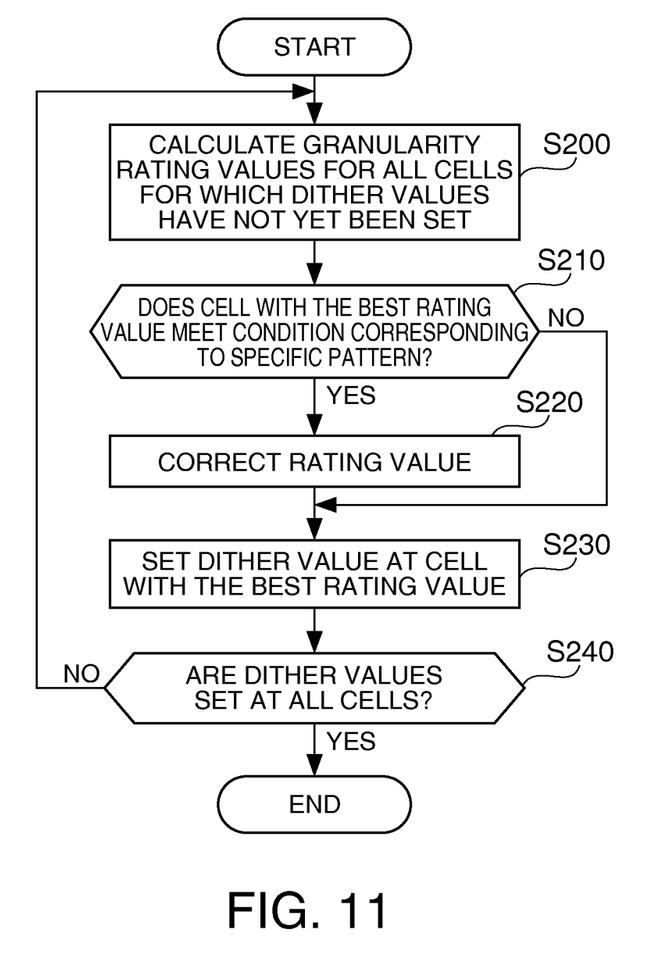
FIG. 11 is a flow chart showing a method of creating a dither matrix.

FIG. 11 is a flow chart showing a method of making a dither matrix used in the blue noise mask method. Here, an example in which the size of the dither matrix is four rows by four columns, in other words, the dither matrix has 16 cells, will be described. Usually, a dither matrix of a huge size, such as, 128 rows by 128 columns, or the like, is used to obtain excellent blue noise characteristics. However, the forming method will be shown here, using a dither matrix of a very small size for the sake of description as an example. The order from $1^{st}$ to $16^{th}$ is set to the cells. The dither values are set according to the order of the cells. Here, let us consider a case where the dither values up to the $(t-1)^{th}$ dither value (the order) have been set, and the $t^{-th}$ dither value is set next. Moreover, the dither matrix is formed by a computer device independent of the electronic apparatus 1, and written in the memory part 60 of the electronic apparatus 1. Therefore, an operation subject for each step is an arbitrary computer device, though the operation subject for each step is not particularly described in the description of FIG. 11.

In step S200, granularity rating values at all cells whose dither values have not been set are calculated. Specifically, the following is performed. First, one candidate cell is specified from among the cells whose dither values are not set. Next, the granularity rating value is calculated under assumption that the cells whose dither values have been set and the candidate cell are on-dots (black pixels), and cells other than the candidate cell are off-dots (white pixels). As the rating value, for example, a granularity index is used.

The granularity index is obtained as follows.
(1) Two-dimensional Fourier transform is applied to dot arrangement data, thereby converting it into spatial frequency data.
(2) Low-pass filter processing based on VTF (Visual Transfer Function), the human visual sensitivity characteristic, is applied to the spatial frequency data, and only a frequency component sensitive to the human eye is retrieved.
(3) The frequency component retrieved is integrated and set as a granularity index.

The granularity index is a component extracted that can be sensed by the human eye as noise, and indicates that the smaller the value, the better the granularity.

Those of the cells with dither values that are not set are specified one by one as a representative cell, and the granularity rating values are calculated for all of the cells with dither values that are not set.

In step S210, whether the cell with the best granularity rating value meets the condition that corresponds to the specific pattern is judged. When it is judged that the condition is met (step S210: YES), the granularity rating value is corrected (step S220). The processing shifts to step S230 when it is judged that the condition is not met (step S210: NO). The conditions in step S210 and the corrections in step S220 may be combined as shown below, for example, in (a)-(d). Note that the cell (j,i) is a representative cell.
(a) when a dither value is set for a cell (j−1, i−1), the granularity rating value is multiplied by k.
(b) when a dither value is set for a cell (j+1, i−1), the granularity rating value is multiplied by k.

(c) when a dither value is set for a cell (j−1, i+1), the granularity rating value is multiplied by k.
(d) when a dither value is set for a cell (j+1, i+1), the granularity rating value is multiplied by k.

Here, k is a real number of 1 or more (for example, k=1.01). For example, when all of the conditions (a)-(d) are met, the granularity rating value is multiplied by $k^4$. By correcting the granularity rating value in this manner, when an arrangement pattern of dither values that would readily generate a checkered pattern seems to be formed, a correction is made such that the rating value of the cell would be increased (in other words, the granularity would deteriorates), whereby the rate of occurrence of checkered patterns is decreased. As for the value k, after a dither matrix has been formed, the rate of occurrence of checkered patterns of a binarized image formed with the dither matrix formed may be measured. When the rate of occurrence exceeds a predetermined value, the value k may be increased (or may be decreased when the rate of occurrence is below the predetermined value), whereby an optimum value of the value k may be obtained.

In step S230, a dither value is set to the cell with the best granularity rating value. In step S240, whether dither values are set for all the cells is judged. When it is not judged that dither values have been set to all the cells (S240: NO), the processing shifts to step S200. When it is judged that dither values have been set to all the cells (S240: YES), the processing in FIG. 11 ends.

According to the dither method that uses the dither matrix formed in a manner as described above, the rate of occurrence of checkered patterns can be controlled below a predetermined value.

2-4. Processing Example 3 (Ternarization by Error Diffusion Method)

In the processing example 1 and the processing example 2, the examples in which b=2, in other words, the color reduction processing is a binarization processing, are described. However, the color reduction processing is not limited to binarization. Here, an example in which b=3, in other words, an example of a ternarization processing will be described. In this example, data is converted into one of three values, i.e., a white pixel (DOT_OFF or off dot), a gray pixel (midDotON or half on dot) or a black pixel (fullDotOn or full on dot). An error diffusion method is used as a concrete method of ternarization.

The basic idea for controlling checkered patterns is similarly applicable to the case where data consists of three values. For example, checkered patterns to be formed with white pixels and gray pixels can be controlled, by replacing the relation between white pixels and black pixels in the processing example 1 with the relation between white pixels and gray pixels. Also, checkered patterns formed with gray pixels and black pixels can be controlled, by replacing the relation between white pixels and black pixels in the processing example 1 with the relation between gray pixels and black pixels.

Hereafter, referring to FIG. 9 and FIG. 10, the operation of the controller 20 in the processing example 3 will be described. In this example, "Binarization" of FIG. 9 and FIG. 10 is replaced with "ternarization." Because this is a ternarization processing, two threshold values, a first threshold value and a second threshold value, are used.

The controller 20 specifies a target pixel in step S100. A pixel at the $i^{-th}$ row and the $j^{-th}$ column, among pixels of m rows by n columns, is specified as the target pixel. The initial condition is, for example, i=j=1.

In step S110, the controller 20 adds an error to data, thereby calculating corrected data. More specifically, the controller 20 calculates correction data at the $i^{-th}$ row and the $j^{-th}$ column, data_x[i][j] by the following expression (45).

$$\text{data\_}x[i][j]=\text{data}[i][j]+\text{error\_buffer}[i][j] \tag{45}$$

In step S120, the controller 20 corrects the threshold value threshold1 or threshold value threshold2, referring to the ternarization result of pixels in the neighborhood. More specifically, in step S121, the controller 20 judges as to whether the ternarization result of neighborhood pixels satisfies a condition corresponding to the specific pattern (checkered pattern). In this example, as the pixels in the neighborhood of the target pixel, four pixels whose ternarization results have been confirmed at the time of processing the target pixel are used. When it is judged that the ternarization result of the pixels in the neighborhood of the target pixel satisfies a condition corresponding to the specific pattern (S121: Yes), the controller 20 shifts the processing to step S122. When it is not judged that the ternarization result of the pixels in the neighborhood of the target pixel satisfies a condition corresponding to the specific pattern (S121: No), the controller 20 shifts the processing to step S130 without correcting the threshold value.

First, a case where checkered patterns formed by white pixels and gray pixels are to be suppressed will be considered. In this case, in step S121, the controller 20 judges if the following expressions (46)-(49) are all satisfied.

$$\text{result}[i-1][j-1]==\text{midDotON} \tag{46}$$

$$\text{result}[i-1][j]==\text{DOT\_OFF} \tag{47}$$

$$\text{result}[i-1][j+1]==\text{midDotON} \tag{48}$$

$$\text{result}[i][j-1]==\text{DOT\_OFF} \tag{49}$$

Here, result[i][j] indicates a ternarization result at the $i^{-th}$ row and the $j^{-th}$ column. midDotON indicates that the ternarization result is a gray pixel, and DOT_OFF indicates that the ternarization result is a white pixel, respectively. Specifically, midDotON indicates a gray level value (midDotON=8 in case of 16 gray levels) that corresponds to a gray pixel, and DOT_OFF indicates a gray level value (DOT_OFF=0) that corresponds to a white pixel, respectively.

In step S122, the controller 20 makes a correction to increase the threshold value threshold1 by the following expression (50), such that the target pixel becomes more difficult to be ternarized to a gray pixel.

$$\text{Threshold1\_}X=\text{threshold1}+\text{thresh\_add1} \tag{50}$$

Here, threshold1_X is the corrected first threshold value. thresh_add1 is an addition value used for the correction of the first threshold value, and is a constant that has a predetermined positive value.

Next, a case where checkered patterns formed by gray pixels and black pixels are to be suppressed will be considered. In this case, in step S121, the controller 20 judges if the following expressions (51)-(54) are all satisfied.

$$\text{result}[i-1][j-1]==\text{fullDotON} \tag{51}$$

$$\text{result}[i-1][j]==\text{midDotON} \tag{52}$$

$$\text{result}[i-1][j+1]==\text{fullDotON} \tag{53}$$

$$\text{result}[i][j-1]==\text{midDotON} \tag{54}$$

fullDotON indicates a gray level value that corresponds to a black pixel (fullDotON=15 in case of 16 gray levels).

In step S122, the controller 20 makes a correction to increase the threshold value threshold2 by the following expression (55), such that the target pixel becomes more difficult to be ternarized to a black pixel.

$$\text{Threshold1\_}X=\text{threshold2}+\text{thresh\_add2} \quad (55)$$

Here, threshold2_X is the corrected second threshold value. thresh_add2 is an addition value used for the correction of the second threshold value, and is a constant that has a predetermined positive value.

In step S130, the controller 20 ternarizes the corrected data of the target pixel, specifically, as follows.

$$\text{When data\_}x>\text{threshold2\_}X, \text{result}[i][j]=\text{fullDotON} \quad (56)$$

$$\text{When threshold2\_}X>=\text{data\_}x>\text{threshold1\_}X, \text{result}[i][j]=\text{midDotON} \quad (57)$$

$$\text{When threshold1\_}X>\text{data\_x}, \text{result}[i][j]=\text{Dot OFF} \quad (58)$$

Processings in step S140-S160 are executed in a similar manner described in the processing example 1 above. Note that the modified example of the processing example 1 is also applicable to the processing example 3.

3. Effect

Figure 12:
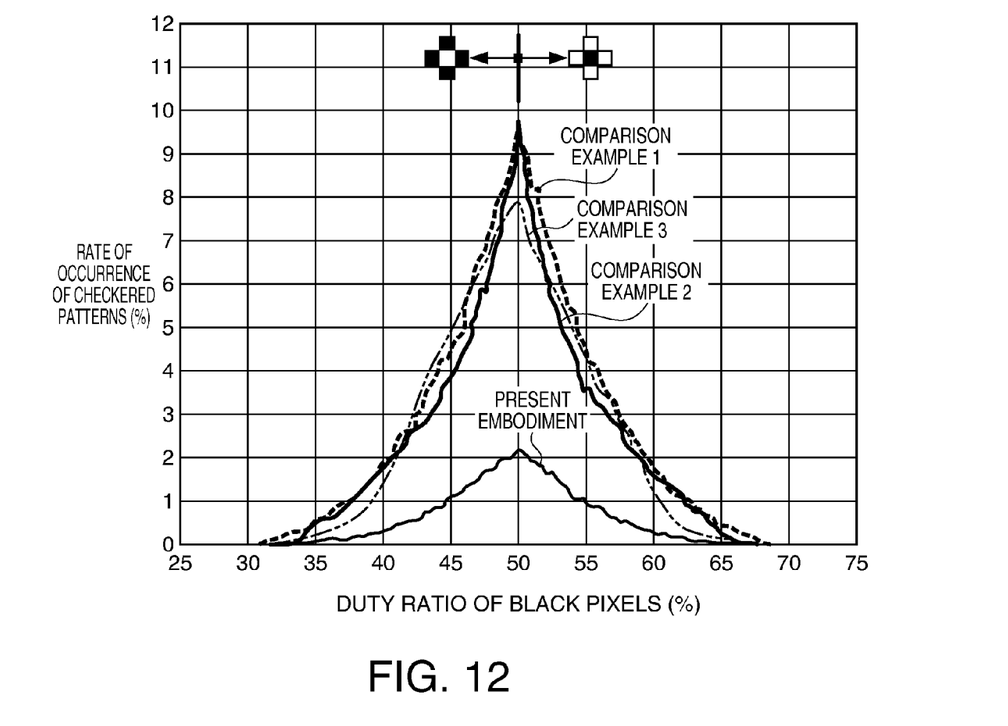
FIG. 12 is a graph showing an example of the rates of occurrence of checkered patterns in the electronic apparatus 1.

FIG. 12 is a graph showing an example of the rate occurrence of checkered patterns in the electronic apparatus 1. A horizontal axis shows the duty ratio of black pixels, and a vertical axis shows the rate of occurrence of checkered patterns. Comparison examples 1-3 are shown in the graph for comparison, in addition to the rate of occurrence in the electronic apparatus 1. The comparison example 1 is a processing example by an error diffusion method of related art. The comparison example 2 is a processing example by another error diffusion method of related art. The comparison example 3 is a processing example by a blue noise mask method of related art. Note that, in the area where the duty ratio of black pixels is less than 50%, the rate of occurrence of checkered patterns with white pixels being the target pixels is shown; and in the area where the duty ratio of black pixels is greater than 50%, the rate of occurrence of checkered patterns with black pixels being the target pixels is shown.

Among the comparison examples 1-3, it is the comparison example 3 that the maximum value of the rate of occurrence of checkered patterns is the lowest. However, the maximum value of the rate of occurrence in the comparison example 3 is still little less than 8%. The maximum value of the rate of occurrence in the comparison example 1 exceeds 10%. In contrast, according to the electronic apparatus 1, the maximum value of the rate of occurrence is 2.3%, in other words, the probability of occurrence of checkered patterns is reduced, compared to the comparison examples 1-3. Therefore, in view of comparison with the comparison examples 1-3, by reducing the rate of occurrence of checkered patterns to at least 7.0% or lower, the rate of occurrence of checkered patterns can be lowered more than the comparison examples 1-3. Furthermore, by reducing the rate of occurrence of checkered patterns to 5.0% or lower, the difference from the comparison examples 1-3 becomes more conspicuous. Also, by randomly arranging white pixels and black pixels at neighboring four pixels (above, below, on the left and on the right) of a target pixel, the rate of occurrence of checkered patterns is about 3.1% ($=1/32$). Therefore, by reducing the rate of occurrence of checkered patterns to less than 3.1%, the rate of occurrence of checkered patterns can be reduced greater, compared to the random arrangement.

4. Modified Examples

The invention is not limited to the embodiments described above, but various modifications are possible. Some of the modification examples will be described below. Two or more of the modification examples below may be used in combination.

4-1. Modification Example 1

Figure 13A:
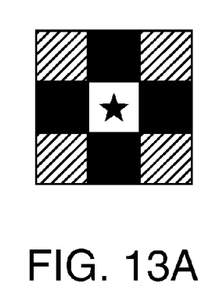
FIGS. 13A and 13B are diagrams illustrating an example of the definition of a specific pattern.

FIGS. 13A-13C are illustrations of examples that define specific patterns. The definition of the specific pattern is not limited to the one described in the embodiments. When the display elements in the display part 10 can express c levels of gray ($c \geq 2$), a specific pattern may be defined as a pattern that meets all of the following conditions (1)-(3) (FIG. 13A), for example. Note that "Arbitrary Gray level" in FIG. 13 means a state without any specific condition about the gray level value.

(1) The gray level value of a target pixel is a first gray level.
(2) The gray level values of four pixels (that is, pixels above, under, on the left and on the right of the target pixel pixel) adjoining the target pixel in the column direction (an example of the first direction) and in the row direction (an example of the second direction) are other than the first gray level.
(3) As for the four pixels in the condition (2), the sign of the difference between the gray level value of each pixel and the first gray level value is the same. For example, when it is possible to express three values of c1, c2, and c3 (c1<c2<c3), and the gray level value of the target pixel is c2, the gray level value of each of the four pixels in (2) is c3, respectively (or c1, respectively).

Figure 13B:
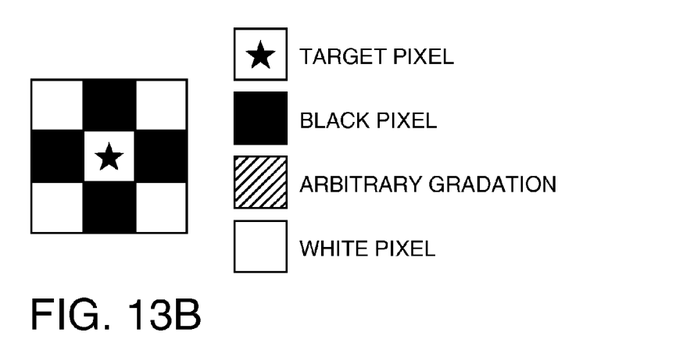

The following condition (4) may be further added to the conditions (1)-(3) (FIG. 13B).

(4) The gray level value of four pixels diagonally adjoining the target pixel (that is, pixels on the upper left, upper right, lower left and lower right of the target pixel) is the first gray level.

Instead of the condition (4), the following conditions (4a) and (4b) may be used.

(4a) The gray level value of four pixels diagonally adjoining the target pixel (that is, pixels on the upper left, upper right, lower left and lower right of the target pixel) is the first gray level, or a gray level value other than the first gray level.

(4b) As for the pixels whose gray level value is other than the first gray level among the four pixels in (4a), the sign of the difference between the gray level value of each pixel and the first gray level value is reverse with respect to the sign in (3).

4-2. Modification Example 2

Relation between the processings and the hardware components is not limited to those described in the embodiments. For example, the subject component that performs a color reduction processing may be the CPU 20, instead of the controller 20.

4-3. Other Modification Example

The electronic apparatus 1 is not limited to an electronic book reader. The electronic apparatus 1 may be a personal computer, a PDA (Personal Digital Assistant), a cellular phone, a smartphone, a tablet terminal, or a portable game console.

The equivalent circuit of pixels 14 is not limited to the one described in the embodiment. Switching elements and capacitance elements may be combined in any way, as long as a controlled voltage can be applied between the pixel electrodes 114 and the common electrode 131. Also, the method of driving the pixels may be a bipolar drive method in which electrophoretic elements 143 applied with voltages of different polarities are present in each single frame or a unipolar drive method in which voltages with a single polarity are applied to all electrophoretic elements 143 in each single frame.

The structure of the pixel 14 is not limited to the one described in the embodiment. For example, the polarities of charged particles are not limited to those described in the embodiment. Black electrophoretic particles may be negatively charged, and white electrophoretic particles may be positively charged. In this case, the polarities of voltages to be applied to the pixels become inversed to the polarities described in the embodiment. Also, the display elements are not limited to electrophoretic type display devices using microcapsules. Other display elements, such as, liquid crystal elements, organic EL (Electro Luminescence) elements or the like may be used.

The parameters described in the embodiment (for example, the number of gray levels, the number of pixels, the voltage value, the number of frames, etc.) are only examples, and the invention is not limited to them.

The entire disclosure of Japanese Patent Application No. 2012-031741, filed Feb. 16, 2012 is expressly incorporated by reference herein.

What is claimed is:

1. An image processing device comprising:
   a processing device that performs a color reduction processing of converting data of a-levels of gray indicative of an image to be displayed in a display area including a plurality of pixels arranged along a first direction and a second direction into data of b-levels of gray (b<a) and, upon receiving an input of data for reducing a number of the plurality of pixels with a first gray level in the display area to 50%, generates a result in which the arrangement of the pixels with the first gray level has blue noise characteristics in the display area, and a maximum value of a rate of occurrence of a specific pattern in the display area is reduced so as to be less than 7.0%,
   the specific pattern being a pixel pattern including a first pixel having a gray level value of the first gray level and four pixels adjoining the first pixel in the first direction and the second direction having gray level values other than the first gray level, and differences between the gray level values of the four pixels and the first gray level have a same sign.

2. An image processing device according to claim 1, wherein the maximum value of the rate of occurrence is 5.0% or less.

3. An image processing device according to claim 2, wherein the maximum value of the rate of occurrence is 3.1% or less.

4. An image processing device according to claim 1, wherein the color reduction processing performed by the processing device includes an error diffusion processing, and a conversion processing that decides a gray level value of a target pixel after the conversion processing, based on comparison between a threshold value and a corrected value obtained based on a gray level value of the target pixel before the conversion processing and an error diffused from another pixel due to the error diffusion processing and,
   in the conversion processing, if a gray level value of another pixel having a predetermined position relation with respect to the target pixel satisfies a condition corresponding to the specified pattern, the processing device changes the threshold value used when deciding the gray level value of the target pixel after the conversion such that a probability of the gray level value of the target pixel becoming to be the first gray level reduces.

5. An image processing device according to claim 1, wherein the color reduction processing performed by the processing device includes a conversion processing that decides a gray level value of a target pixel after the conversion, based on comparison between a dither value included in a dither matrix and a gray level value of each of the pixels,
   the dither matrix being generated by a processing that calculates a granularity rating value at each of all positions whose dither values are undecided when a position of a $t^{-th}$ dither value is to be decided, while positions of dither values up to a $(t-1)^{-th}$ dither value have already been decided, and sets a $t^{-th}$ dither value at a position with a best rating value calculated; and
   when calculating the granularity rating value, if a position having a predetermined position relation with a target position, where a dither value has already been set, satisfies a condition corresponding to the specific pattern, the processing device changes the granularity rating value rating value, such that the probability of setting a dither value at the target position is reduced.

6. A display device comprising the image processing device recited in claim 1, and a display portion having the display area.

7. An image processing method of converting data of a-levels of gray indicative of an image to be displayed in a display area that includes a plurality of pixels arranged along a first direction and a second direction into data of b-levels of gray (b<a) using a processing device comprising a computer processor executing a series of executable processes stored in non-transitory memory, the image processing method comprising:
   upon receiving an input of data for reducing a number of pixels with a first gray level in the display area to 50%, generating a result in which an arrangement of the pixels with the first gray level has blue noise characteristics in the display area, and a maximum value of a rate of occurrence of a specific pattern in the display area is reduced so as to be less than 7.0%,
   the specific pattern being a pixel pattern including a first pixel having a gray level value of the first gray level and four pixels adjoining the first pixel in the first direction and the second direction, having gray level values other than the first gray level, and differences between the gray level values of the four pixels and the first gray level have a same sign.

* * * * *